US012321498B2

(12) United States Patent
Ezrielev et al.

(10) Patent No.: US 12,321,498 B2
(45) Date of Patent: Jun. 3, 2025

(54) SYSTEM AND METHOD FOR MANAGING AI MODELS USING ANOMALY DETECTION

(71) Applicant: Dell Products L.P., Round Rock, TX (US)

(72) Inventors: Ofir Ezrielev, Be'er Sheva (IL); Amihai Savir, Newton, MA (US); Tomer Kushnir, Omer (IL)

(73) Assignee: Dell Products L.P., Round Rock, TX (US)

( * ) Notice: Subject to any disclaimer, the term of this patent is extended or adjusted under 35 U.S.C. 154(b) by 294 days.

(21) Appl. No.: 18/147,769

(22) Filed: Dec. 29, 2022

(65) Prior Publication Data

US 2024/0220664 A1 Jul. 4, 2024

(51) Int. Cl.
*G06F 21/64* (2013.01)
*G06F 21/57* (2013.01)

(52) U.S. Cl.
CPC .............. *G06F 21/64* (2013.01); *G06F 21/57* (2013.01)

(58) Field of Classification Search
CPC ................................. G06F 21/64; G06F 21/57
See application file for complete search history.

(56) References Cited

U.S. PATENT DOCUMENTS

| | | | |
|---|---|---|---|
| 10,936,969 B2 | 3/2021 | Patel et al. | |
| 11,087,170 B2 | 8/2021 | Malaya | |
| 11,487,963 B2 | 11/2022 | Angel | |
| 11,544,501 B2 | 1/2023 | Dong | |
| 11,636,726 B2 | 4/2023 | Purohit | |
| 11,645,515 B2 | 5/2023 | Angel | |
| 11,785,024 B2 | 10/2023 | Karam | |
| 11,797,672 B1 | 10/2023 | Beveridge | |
| 11,829,193 B2 | 11/2023 | Shukla | |
| 11,847,217 B2 | 12/2023 | Healy | |
| 11,921,903 B1 | 3/2024 | Beveridge | |
| 12,032,541 B2 | 7/2024 | Hasabnis | |

(Continued)

FOREIGN PATENT DOCUMENTS

| | | |
|---|---|---|
| WO | 2020040777 A1 | 2/2020 |
| WO | 2021213626 A1 | 10/2021 |

(Continued)

OTHER PUBLICATIONS

Albert Cheng. "The Machine Learning Minefield—How to Avoid Getting Hit by Machine Learning Poisoning" published Mar. 22, 2022 (10 pages) (Year: 2022).*

(Continued)

*Primary Examiner* — Joseph P Hirl
*Assistant Examiner* — Thomas A Gyorfi
(74) *Attorney, Agent, or Firm* — WOMBLE BOND DICKINSON (US) LLP

(57) ABSTRACT

Methods and systems for managing artificial intelligence (AI) models are disclosed. As AI models are updated over time using new training data, the new training data may be screened and snapshots of the AI models may be obtained. Screening the new training data may reduce the likelihood that AI models become tainted and provide undesired inferences. The snapshots may be used to remediate tainted AI models when trained using poisoned training data that was not screened. Use of snapshots may reduce the computational expense for remediating the impact of poisoned training data.

20 Claims, 9 Drawing Sheets

(56) References Cited

U.S. PATENT DOCUMENTS

| | | | |
|---|---|---|---|
| 12,126,640 | B2 | 10/2024 | Woodworth |
| 12,143,405 | B2 | 11/2024 | Chen Kaidi |
| 2017/0177860 | A1 | 6/2017 | Suarez |
| 2018/0255023 | A1* | 9/2018 | Whaley .............. H04L 63/0421 |
| 2019/0377873 | A1 | 12/2019 | Murphy |
| 2020/0050945 | A1 | 2/2020 | Chen |
| 2020/0082097 | A1 | 3/2020 | Poliakov |
| 2020/0082270 | A1 | 3/2020 | Gu |
| 2021/0073685 | A1 | 3/2021 | Veshchikov |
| 2021/0081831 | A1 | 3/2021 | Angel |
| 2021/0209512 | A1 | 7/2021 | Gaddam et al. |
| 2021/0303695 | A1 | 9/2021 | Grosse |
| 2021/0374247 | A1* | 12/2021 | Sultana ................... G06F 21/57 |
| 2021/0398020 | A1 | 12/2021 | Ahmad et al. |
| 2022/0179840 | A1 | 6/2022 | Chatterjee |
| 2022/0414492 | A1 | 12/2022 | Jezewski |
| 2023/0079112 | A1* | 3/2023 | Cheruvu ............. G06F 9/30101 706/12 |
| 2023/0148116 | A1 | 5/2023 | Stokes, III |
| 2023/0164162 | A1 | 5/2023 | Lee |
| 2023/0222385 | A1 | 7/2023 | Shimizu |
| 2023/0274003 | A1 | 8/2023 | Liu |
| 2023/0274192 | A1 | 8/2023 | Wang |
| 2024/0015019 | A1 | 1/2024 | Sneider |
| 2024/0119153 | A1 | 4/2024 | Ludmir |
| 2024/0364534 | A1 | 10/2024 | Ezrielev |
| 2025/0055762 | A1* | 2/2025 | Walker ................... H04L 43/50 |

FOREIGN PATENT DOCUMENTS

| | | | | |
|---|---|---|---|---|
| WO | WO-2022216142 | A1 * | 10/2022 | .......... G06F 11/3495 |
| WO | WO-2023111287 | A1 * | 6/2023 | ........... H04L 41/145 |

OTHER PUBLICATIONS

Anastasovski, Goce, "Classification of Malicious Web Traffic" (2013), Graduate Theses, Dissertations, and Problem Reports 153 (118 Pages).

Joshi, Naveen, "Is The Data Used For Training Your Machine Learning Model Safe?", Technology For You, Jul. 28, 2022, <https://www.technologyforyou.org/is-the-data-used-for-training-your-machine-learning-model-safe/> (3 Pages).

Wang, Siruo et al., "Methods for correcting inference based on outcomes predicted by machine learning." Proceedings of the National Academy of Sciences 117.48 (2020): 30266-30275. (10 Pages).

Rauschmayr, Nathalie et al., "Detecting and analyzing incorrect model predictions with Amazon SageMaker Model Monitor and Debugger", AWS Machine Learning Blog, Jul. 9, 2020, <https://aws.amazon.com/blogs/machine-learning/detecting-and-analyzing-incorrect-model-predictions-with-amazon-sagemaker-model-monitor-and-d%E2%80%A6/> (13 Pages).

Higgins, Kelly Jackson, "Honeypot Stings Attackers With Counterattacks", Dark Reading, Mar. 26, 2013, <https://www.darkreading.com/vulnerabilities-threats/honeypot-stings-attackers-with-counterattacks> (4 Pages).

Susmelj, Igor, "The Data You Don't Need: Removing Redundant Samples", Towards Data Science, Mar. 19, 2020, https://towardsdatascience.com/the-data-you-don-t-need-removing-redundant-samples-6bfd07c1516c> (10 Pages).

Paduraru, Ciprian, Marius-Constantin Melemciuc, and Bogdan Ghimis. "Fuzz Testing with Dynamic Taint Analysis based Tools for Faster Code Coverage." ICSOFT 19 (2019): 82-93. (Year: 2019).

Jiang, Bingchen, and Zhao Li. "Defending Against Backdoor Attack on Graph Nerual Network by Explainability." arXiv preprint arXiv: 2209.02902, 10 pages, (Year: 2022).

Raghavan, Vijay, Thomas Mazzuchi, and Shahram Sarkani. "Discover Artificial Intelligence: An improved real time detection of data poisoning attacks in deep learning vision systems", 17 pages, Discover 2022, (Year: 2022).

* cited by examiner

SYSTEM AND METHOD FOR MANAGING AI MODELS USING ANOMALY DETECTION

FIELD

Embodiments disclosed herein relate generally to artificial intelligence (AI) models. More particularly, embodiments disclosed herein relate to systems and methods to manage AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
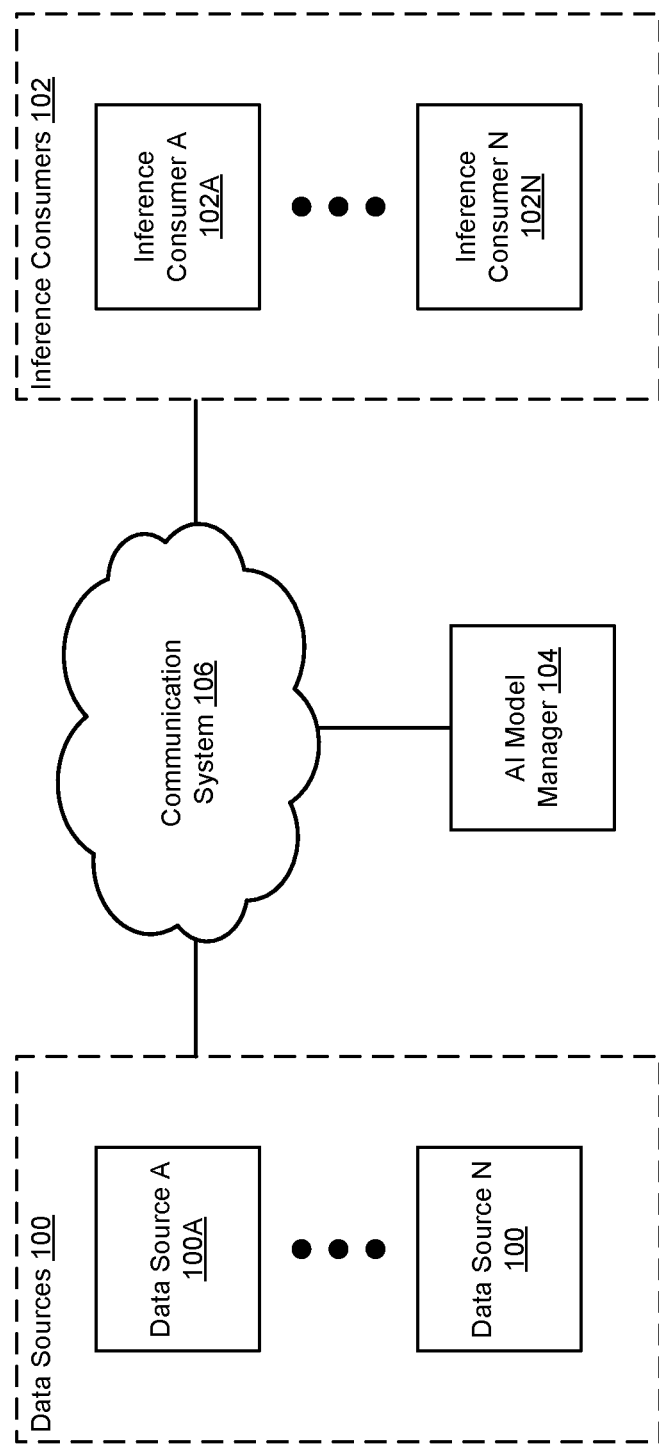
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing AI models. Trained AI models may provide computer-implemented services (e.g., inference generation) for downstream consumers (e.g., inference consumers, which may provide computer-implemented services using the inferences). A data processing system may, over time, update AI models through training using training data. However, if poisoned training data is introduced to the AI model, the AI model may become untrustworthy (e.g., the AI model may be tainted by the poisoned training data). Inferences generated using the tainted AI model may also be untrustworthy or inaccurate (e.g., poisoned inferences).

If an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training AI models may interrupt inference generation, consumption, and/or other types of computer-implemented services that may otherwise be provided using the computing resources dedicated to re-training.

Once the AI model is retrained, any and/or all inferences provided to inference consumers using the tainted AI model may require replacement. Inference generation may be required for an entire ingest dataset, prompting another inefficient use of computing resources.

To reduce computing resources spent re-training AI models, an AI model snapshot may be obtained periodically throughout the AI model training process. The snapshot may store information regarding the structure of the AI model, which may be used to restore a partially trained untainted AI model. The restored AI model may require training using only a subset of the original training dataset, thereby requiring fewer computational resources than re-training an AI model from scratch using the entire training dataset. Thus, reverting to a last known good AI model may require less resource expenditure than re-training an AI model from scratch.

The snapshot may also store information regarding poisoned inferences obtained from the tainted AI model. This information may be used to (i) identify poisoned inferences generated from the tainted AI model, (ii) replace poisoned inferences already provided to the inference consumer, (iii) identify poisoned training data being used to train the tainted AI model, and/or (iv) identify the data sources supplying the poisoned training data. By identifying the poisoned inferences, only a portion of the ingest dataset may be required to generate replacement inferences.

In addition to snapshots, new training data may be screened prior to use for AI model training. The new training data may be screened using anomaly detection with respect to training data already used to obtain trained AI model instances. Portions of the new training data that exceed a degree of anomalousness with respect to the previously used training data my be treated as being poisoned. The portions treated as being poisoned may, for example, be excluded from AI model thereby preventing tainted AI model instances from being generated.

By doing so, embodiments disclosed herein may provide a system for managing AI models that reduce the likelihood of poisoned inferences being generated. By screening training data prior to use in training, the likelihood of introduction of poisoned training data for model training purposes may be reduced. Consequently, the computing resources expended for managing AI models may be reduced. Thus, the disclosed embodiments may address, in addition to other challenges, the technical problem of limited computing resources available for providing computer implemented services. The disclosed embodiments may address this technical problem by reducing consumption of computing resources for remediating poisoned inferences, thereby improving the availability of computing resources for other purposes such as providing computer-implemented services.

In an embodiment, a method for managing an artificial intelligence (AI) model is provided. The method may include making an identification that new training data for the AI model is available; and, based on the identification: obtaining an anomaly level classification for the new training data; making a determination regarding whether the anomaly level classification exceeds an anomaly level threshold; in a first instance of the determination where the anomaly level classification exceeds the anomaly level threshold: treating the new training data as comprising poisoned training data; using an existing instance of the AI model to provide computer implemented services; in a second instance of the determination where the anomaly level classification does not exceed the anomaly level threshold: performing self-supervised learning (or semi-supervised labeless learning) using the new training data to obtain a new instance of the AI model; and using the new instance of the AI model to provide the computer implemented services.

The anomaly level classification may be based on a corpus of training data used to obtain the existing instance of the AI model. The corpus of the training data may be unlabeled.

The method may also include performing a similarity analysis between a portion of the new training data and the corpus of the training data to identify a portion of the corpus of the training data; and treating the portion of the corpus of the training data as potentially comprising second poisoned training data.

The method may further include obtaining second new training data for an AI model instance is available; using classification metrics obtained during the similarity analysis to identify a portion of the second new training data; and treating the portion of the second new training data as comprising third poisoned training data.

Treating the new training data as including the poisoned training data may include excluding the new training data from the corpus of the training data; and performing at least one action from a group of actions consisting of: marking a source of the new training data as potentially being compromised; and submitting the new training data for analysis by a subject matter expert to confirm whether the new training data comprises the poisoned training data.

The new instance of the AI model may be based on the existing instance of the AI model. The new training data may be unlabeled.

In an embodiment, a non-transitory media is provided. The non-transitory media may include instructions that when executed by a processor cause the method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences. The ingest data may also be used to train the AI models.

To manage the AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104) and/or other entities using AI models managed by AI model manager 104. However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models. For example, updating instances of the AI models may be obtained through training as more training data is obtained (e.g., incremental learning).

Training of AI models may be computationally costly because training may require significant resource expenditures. However, the introduction of malicious or poisoned training data can in turn, poison (i) the new AI model instance, (ii) any inferences obtained from the poisoned AI model instance, and (iii) other AI model instances derived from the new AI model instances that are poisoned.

In general, embodiments disclosed herein may provide methods, systems, and/or devices for managing AI models. The AI models may be managed in a manner that allows for the impact of poisoned training data to be remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated (e.g., such as availability of additional training data), (vii) generate snapshots for the AI model as it is updated over time, and (viii) remediate the AI model when poisoned training data has been used to update the AI model.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot.

Generating snapshots of the AI model over time may allow for the impact of poisoned data to be computationally efficiently mitigated. Generating snapshots of the AI model over time may also allow for (i) the identification of poisoned training data, (ii) the impact of poisoned training data to be computationally efficiently mitigated, and/or (iii) the management of data sources supplying poisoned training data (e.g., a malicious party may supply poisoned training data through a data source as part of an attack on the AI model).

To identify whether newly obtained training data includes poisoned training data, the new training data may be subject to anomaly detection (e.g., with respect to existing training data used to obtain AI model instances). The anomaly detection may provide one or more classifications for portions of the new training data. If the classifications exceed a threshold (e.g., an anomaly level threshold), then the corresponding portions of the new training data may be treated as including poisoned training data. For example, the portions of the new training data and/or all of the new training data my not be used to update the AI model.

However, some types of poisoned training data may not be detectable via anomaly detection. Consequently, other methods of detecting poisoned training data may be implemented. At least one of these methods may be retrospective. Accordingly, in some cases, poisoned training data may identified after it has been used to update AI models.

To mitigate the impact of poisoned training data previously used to update the AI models, AI model manager 104 may obtain a poisoned data notification (e.g., from an entity that has identified that previously used training data, in fact, includes poisoned training data). When a poisoned data notification is identified, AI model manager 104 may use the snapshots to (i) revert an existing AI model instance to a previous AI model instance that is not tainted by the poisoned data, (ii) update the previous AI model instance to obtain an updated AI model instance that is not tainted by the poisoned data, (iii) identify poisoned inferences provided by the existing AI model inference (and/or previous versions that were also tainted by the poisoned data), (iv) obtain replacement inferences using the updated AI model instance, (v) delete the identified poisoned inferences, (vi) notify inference consumers 102 of the poisoned inferences, and/or (vii) flag a data source that has supplied the poisoned training data (e.g., to prevent the collection of poisoned training data in the future).

By doing so, embodiments disclosed herein may reduce inference supply interruptions to inference consumers 102 by (i) reducing the likelihood of poisoned training data being used to update AI models and (ii) reducing computing resources used for retraining tainted AI models even when poisoned training data has been used to update AI models.

In order to obtain a trained AI model instance, AI model manager 104 may obtain an AI model and a training dataset. The training dataset may be obtained through one or more data sources 100. Data sources 100 may include any number of data sources (e.g., 100A, 100N). For example, an AI model may be used for facial recognition; that is, identifying a person from an image or video. In this example, the AI model may be a deep learning model type and data sources may include multiple social media platforms. A training dataset may be created by collecting images or video of a person. The training dataset may then be used to train an instance of the AI model.

In an embodiment, the instance of the AI model is trained using self-supervised learning (or labeless semi-supervised learning). Accordingly, the training data used to obtain instances of the AI model may not be labeled.

Further, in order to obtain an inference from the trained AI model instance, other data may be collected from the same data sources 100 or another data source. Continuing with the above example, another data source 100 may be a security camera. The ingest dataset may include images or video of the same person. An inference (e.g., an identification of the person) may be obtained from the trained instance of the AI model after ingesting the ingest dataset (e.g., may be used for inferencing and training purposes), and the inference may be distributed to inference consumers 102.

Inference consumers 102 may include any number of inference consumers (e.g., 102A, 102N). Inference consumers 102 may include businesses, individuals, or computers that may use the inference data to improve and/or automate decision-making. In the above example, the inference consumer may be law enforcement attempting to identify a person, and/or the inference consumer may offer computer-implemented services for businesses in order to determine which products may appeal to a potential customer.

While the example supplied is with respect to AI facial recognition, it will be appreciated that an AI model may be used to achieve other types of goals.

When performing its functionality, one or more of AI model manager 104, data sources 100, and inference consumers 102 may perform all, or a portion, of the methods and/or actions shown in FIGS. 2A-3C.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be facilitate performance of computer implemented services using inferences. In FIGS. 2A-2D data flow diagram in accordance with an embodiment are shown that may be performed by the system in FIG. 1 when providing this functionality.

Figure 2A:
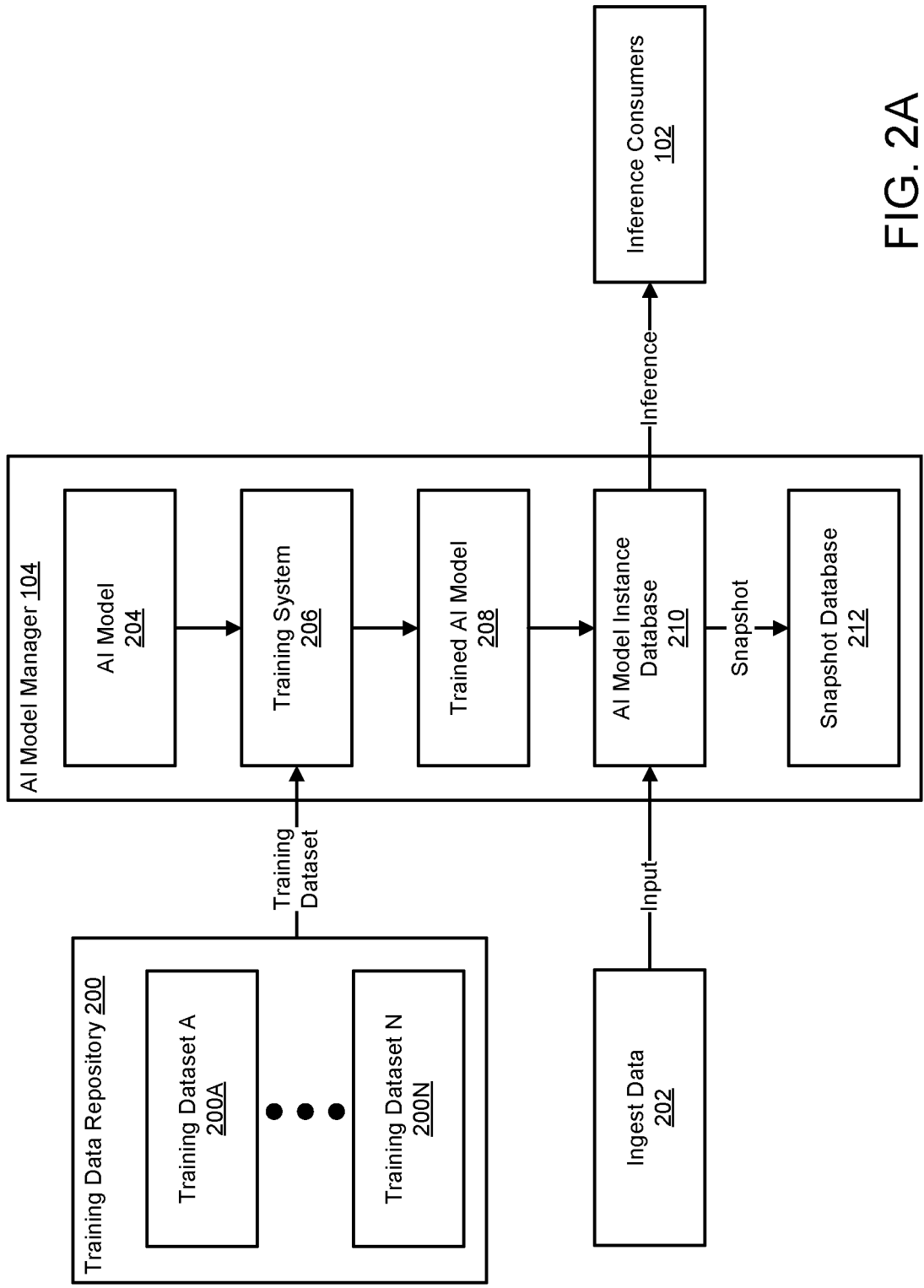
FIG. 2A shows a data flow diagram illustrating an AI model management system in accordance with an embodiment.

Turning to FIG. 2A, a first data flow diagram in accordance with an embodiment is shown. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume mask recognition services for images or video to identify whether persons are attempting to conceal their identities using masks. These services may be provided by using AI models that have been trained using self-supervised learning to classify persons as either wearing or not wearing masks.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include labeled data and/or unlabeled data, depending on the self-supervised learning implementation implemented by AI model manager 104. For example, in the context of facial recognition, training data repository 200 may include images or video of persons that are labeled, and other images or video of persons that are unlabeled with respect to weather or not a mask is being worn by the respective persons. The unlabeled data may be collected via ingest data 202 acquisition and use for inferencing, and may be subsequently used to supplement training data repository 200.

Data sources 100 may provide ingest data 202. Ingest data 202 may be a portion of data for which an inference is desired to be obtained. Ingest data 202 may not be labeled data and, thus, an association for ingest data 202 may not be known. For example, returning to the mask detection services example, ingest data 202 may include images persons without labels indicating whether the persons are wearing masks. Ingest data 202 may be used by AI model manager 104 to obtain a classification for the depicted persons regarding whether they are wearing masks (a downstream consumer may use the classification to, for example, issue a security alert or take other type of action).

AI model manager 104 may provide inferences for ingest data, such as ingest data 202. To do so, AI model manager 104 may include AI model 204 and training system 206. AI model 204 may be trained by training system 206 using one or more training datasets (e.g., training dataset 200A). For example, training system 206 may employ self-supervised learning using a training dataset that includes labeled and/or unlabeled data.

Once trained, trained AI model 208 may attempt to map ingest data to the desired output data (e.g., a mask classification), as well as make inferences based on ingest data 202 that may differ from the training data used to train trained AI model 208. In the context of the mask recognition services example, trained AI model 208 may be a trained mask recognition AI model, trained to map the depictions of persons in images to classifications reflect whether the person in the images is wearing a mask.

To provide mask recognition services, AI model manager 104 may train any number of AI models which may generate inferences usable to identify persons in images. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the identity of persons depicted in ingest data 202.

Once selected, ingest data 202 may be input to a trained AI model instance to generate an inference. AI model manager 104 may obtain the inference, which may be provided to inference consumers 102. In the mask recognition example, an image depicting a person may be input to the trained mask recognition AI model, and a mask status classification for the person may be obtained by AI model manager 104, and the mask status classification for the person may be provided to an inference consumer such as a loss prevention system of a business.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212, and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance (e.g., the data sources that supply the training datasets).

Thus, as illustrated in FIG. 2A, the system of FIG. 1 may provide inferences using trained AI models. However, as noted above, if the trained AI models are poisoned then the trained AI models may no longer be trustworthy for inference generation. AI model manager 104 may manage inference generation when tainted trained AI models are identified, using the snapshots of snapshot database 212 to computationally efficiently restore inference generation functionality, manage poisoned inferences, and/or otherwise mitigate the impact of poisoned training data.

Figure 2B:
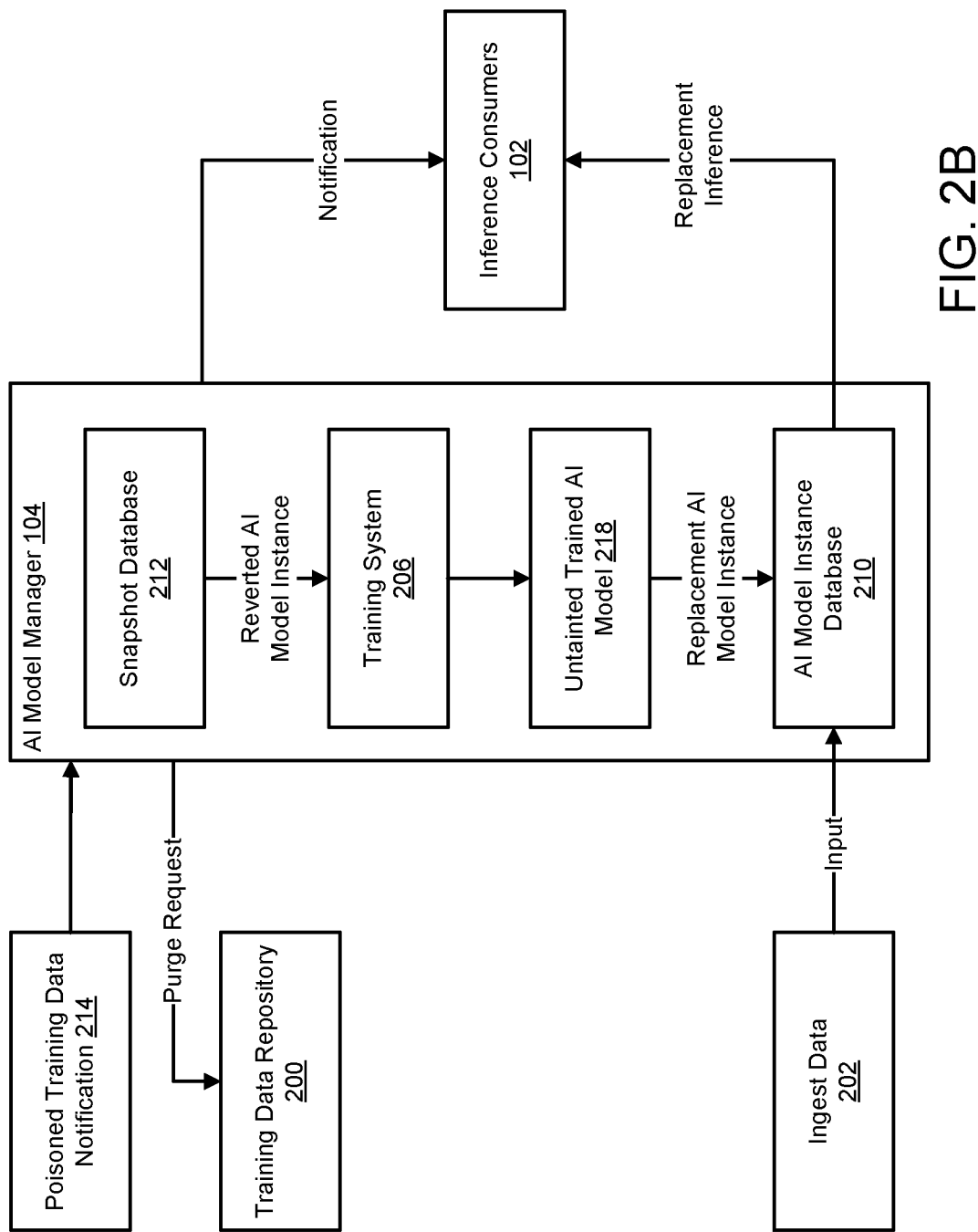
FIG. 2B shows a data flow diagram illustrating an AI model management system managing poisoned training data in accordance with an embodiment.

Turning to FIG. 2B, a second data flow diagram in accordance with an embodiment in shown. In the event that a poisoned training dataset is identified (e.g., after being used to train an AI model, refer to FIG. 2D for additional details regarding prevention of using poisoned training data for training of AI models), AI model manager 104 may obtain poisoned training data notification 214. Poisoned training data notification 214 may be generated using information in snapshot database 212 or other data sources, either internally, or by another source and/or device. Poisoned training data notification 214 may include information that identifies components associated with a trained AI model that are impacted by poisoned training data used to obtain the trained AI model.

The components may include (i) a poisoned portion of a training dataset, (ii) a tainted trained AI model instance associated with the poisoned portion of the training dataset, (iii) a time period associated with the poisoning (e.g., the time when the poisoned training data is introduced to the AI model, and/or the time the poisoning is remediated), (iv) a poisoned inference associated with the tainted AI model instance, (v) an inference consumer that consumed the poisoned inference, and/or (vi) a data source 100 that supplied the poisoned training data.

For example, in the context of mask recognition services, a poisoned portion of a training dataset may be an image that is entirely unrelated to mask classification (e.g., may not even depict persons). In this example, the injection of the entirely unrelated image to mask classification may reduce the predictive power of an AI model trained using the image.

Once the components are identified and to mitigate the impact of the components, AI model manager 104 may (i) send a notification to inference consumers 102 regarding the poisoned inference, (ii) send a purge request to training data repository 200 regarding the poisoned portion of the training dataset, and/or (iii) revert a tainted AI model instance to a previous AI model instance. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., retraining/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create updated training data repository 216, shown in FIG. 2C. Updated training data repository 216 may not include any portions of poisoned training data. An updated training dataset from updated training data repository 216 may be used to train an untainted AI model instance that is trustworthy for inference generation.

Figure 2C:
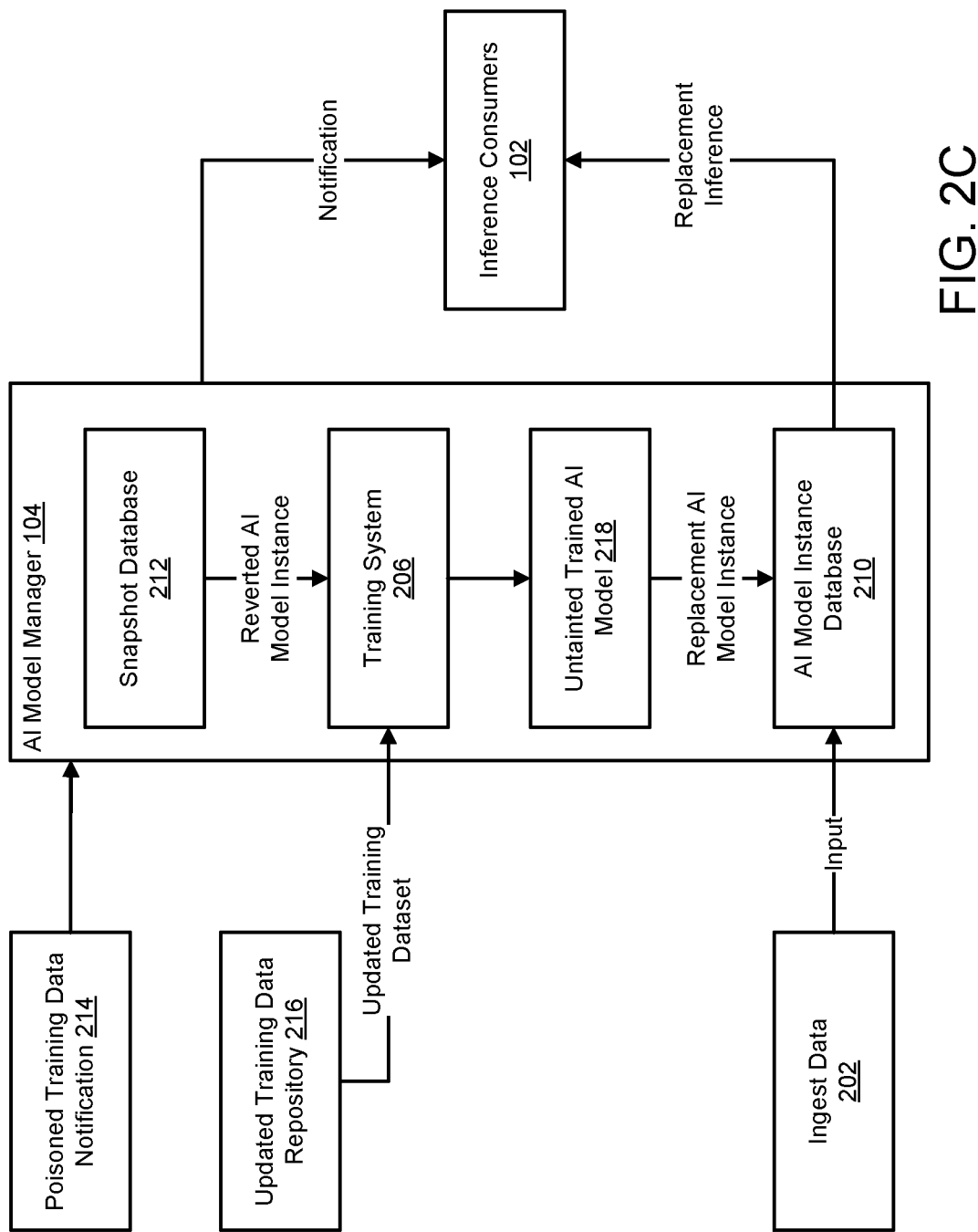
FIG. 2C shows a data flow diagram illustrating an AI model management system managing and remediating poisoned training data in accordance with an embodiment.

Turning to FIG. 2C, a third data flow diagram in accordance with an embodiment is shown. To obtain untainted trained AI model 218, training system 206 may use an updated training dataset to train a reverted AI model instance (e.g., a last known good AI model instance). To reduce computational resources expended during AI model training, the updated training dataset used to train a reverted AI model instance may only include training data not already used to train the reverted AI model instance (e.g., training data input to training system 206 after the poisoned training data was obtained). AI model manager may then replace a tainted trained AI model instance stored in AI model instance database 210 with untainted trained AI model 218.

Like removal of the poisoned training data to reduce the impact of the poisoned training data on operation of the system, untainted trained AI model 218 may be used to generate a replacement inference for a poisoned inference (e.g., generated by the tainted trained AI model) by ingesting a portion of ingest data 202 (e.g., which may have been used to generate the poisoned inference). AI model manager 104 may then provide the replacement inference to inference consumers 102 and/or otherwise use the replacement inference to reduce the impact of the poisoned inference.

For example, returning to the mask recognition services example, AI model manager 104 may send a notification to a loss prevention system regarding the incorrect identification of the mask status of a person (e.g., previously identified as wearing a mask), and training data repository 200 may be updated by removing the one or more images corresponding to the poisoned training data. Consequently, updated training data repository 216 may be used to train a reverted mask recognition AI model (e.g., a last known good mask recognition AI model) without the impact of the poisoned training data. The reverted mask recognition AI model may be trained using only the portion of images and/or video from the updated training data repository that have not been previously used to update the reverted facial recognition AI model. Once trained, the untainted mask recognition AI model may ingest new video depicting the person and send an updated identification to the loss prevention system.

While a mask recognition service example is used herein, it will be appreciated that the data flows shown in FIGS. 2A-2C may be used to achieve other types of goals without departing from embodiments disclosed herein.

Figure 2D:
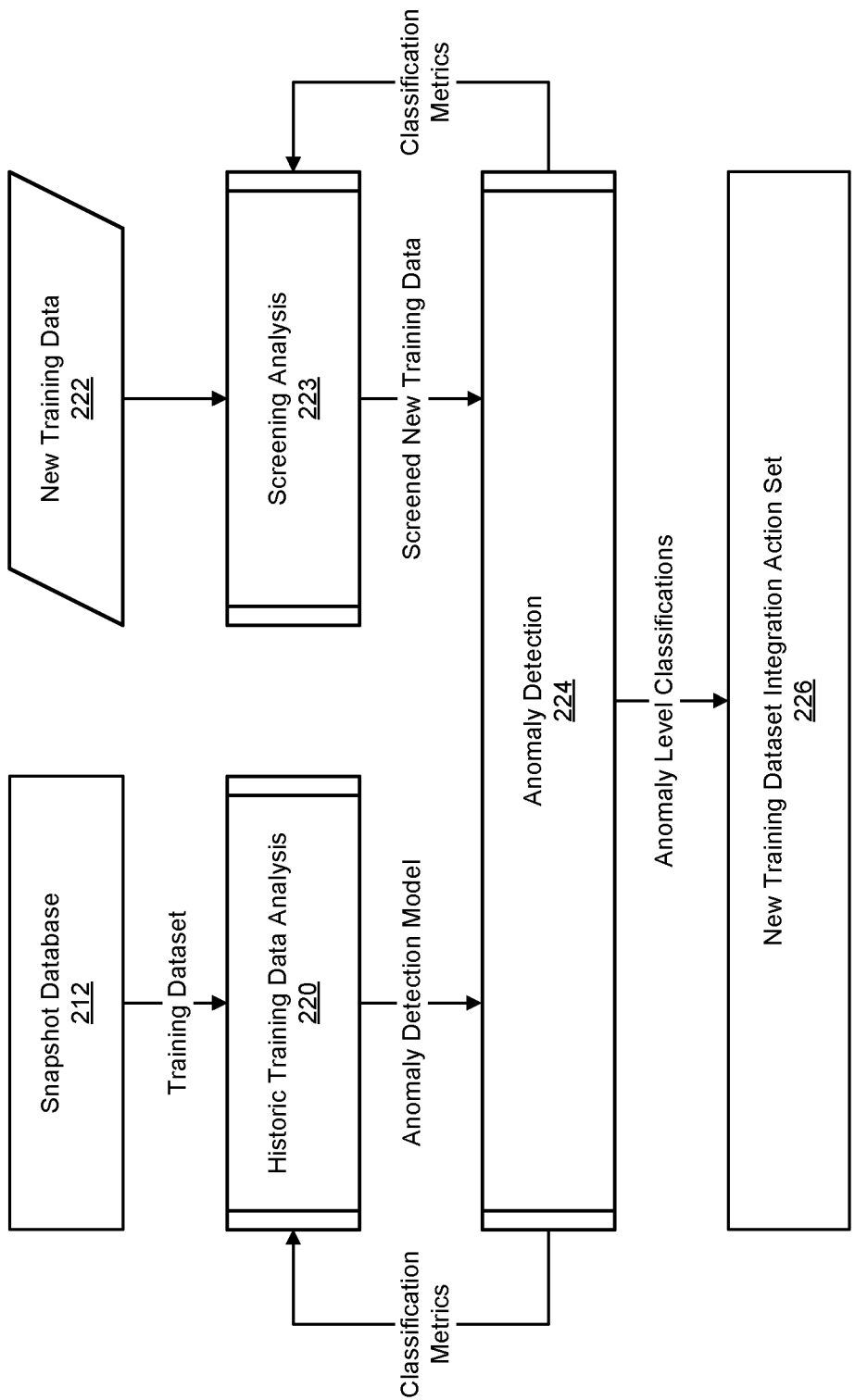
FIG. 2D shows a data flow diagram illustrating an AI model management system screening training data in accordance with an embodiment.

Turning to FIG. 2D, a fourth data flow diagram in accordance with an embodiment is shown. In addition to remediating the impact of poisoned training data, the system of FIG. 1 may also attempt to proactively prevent use of poisoned training data thereby eliminating some remediations.

When new training data 222 is obtained (e.g., that may be used to train an AI model), the system may perform an analysis to ascertain whether some or all of the new training data 222 likely includes poisoned training data.

To perform the analysis, a corpus of training data used to train an AI model that may be further trained using new training data 222 may be obtained from snapshot database 212. The corpus of training data may include one or more training data sets.

Historic training data analysis 220 may be performed using the corpus of training data (and/or classification metrics, discussed below) to obtain an anomaly detection model. The anomaly detection model may be usable to classify whether portions of new training data 222 are anomalous (and/or a degree of anomalousness) with respect to the corpus of the training data. The anomaly detection model may be implemented with, for example, a trained neural network or other type of anomaly detection model.

New training data 222, or a portion thereof (e.g., screened new training data), may then be subjected to anomaly detection 224 (may be performed after screening analysis 223, discussed below). During anomaly detection 224, the anomaly detection model may be used to identify (i) whether portions of new training data 222 are anomalous, and (ii) classifications regarding the extent of the anomalousness of the portions of the new training data 222 (e.g., in aggregate, referred to as "anomaly level classifications").

For example, portions of screened new training data may be ingested into anomaly detection model, which may output quantifications for each of the portions. The quantification corresponding to each of the portions may be compared to one or more thresholds. One of the thresholds may define whether the quantification indicates that the portion of the screened new training data is anomalous (e.g., whether the quantification exceeds a threshold). Other thresholds may define whether the quantification indicates that a classification metric should be established based on the portion of the data. The other thresholds may, for example, be the same as the one of the thresholds, or may be larger (e.g., thereby requiring that a higher degree of amorousness be present for a classification metric to be established).

The anomaly detection model may be (i) static (e.g., not updated based on data drift), or (ii) dynamic (e.g., updated based on data drift).

The classification metrics may represent characteristics of portions of training data that, if met, indicate the portions of the training data are likely poisoned. For example, the classification metrics may be the portion of the training data and a similarity threshold. If other portions of training data (new or in snapshot database 212) are similar to the portion of the training data within the similarity threshold, then the other portions of the training data may be treated as likely including poisoned training data.

The classification metrics may be used, for example, during screening analysis 223 and/or historic training data analysis. During screening analysis 223, new training data 222 may be screened based on the classification metrics (e.g., thereby removing or flagging portions of new training data 222 as likely including poisoned training data). Similarly, during historic training data analysis 220, the corpus of training data may be similarly screened. Accordingly, during anomaly detection 224, the portions of new training data 222 screened as likely including poisoned training data may not need to be analyzed.

The anomaly level classifications for the portions of the screened new training data may be used to perform new training data set integration action set 226. For example, the anomaly level classifications may be used to identify the actions to perform with respect to each of the portions of the screened new training data.

Portions identified as anomalous by the anomaly level classifications may, for example, be excluded from integration into training data repositories and/or use in training AI models. In this manner, the likelihood of introduction and use of poisoned training data may be reduced. Accordingly, the quantity of computing resources used for performing remediations due to use of poisoned training data may be reduced.

As described in FIG. 2D, the system of FIG. 1 may use information from snapshots to pre-screen potential training data for poisoned training data based on whether the training data is anomalous.

Figure 3A:
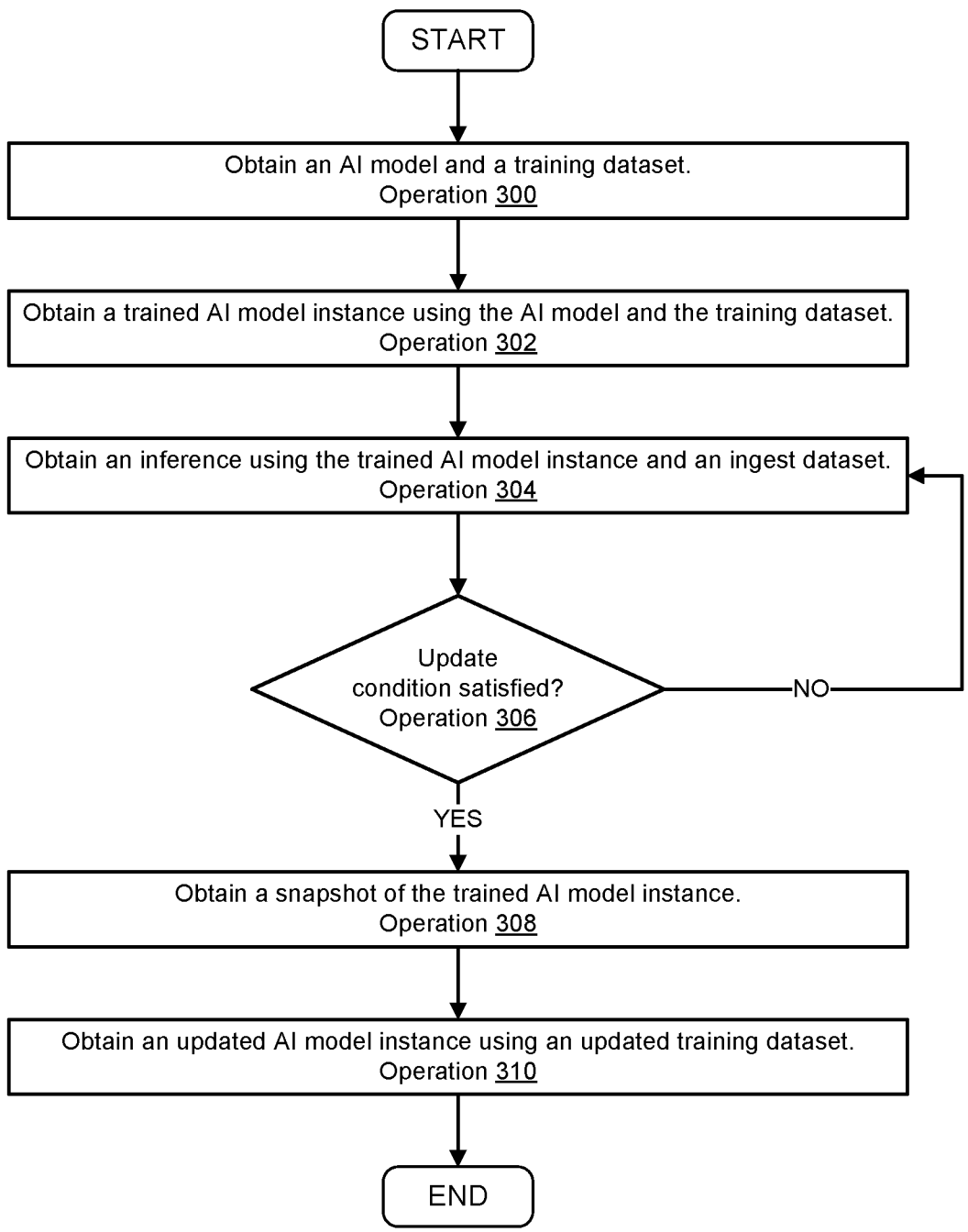
FIG. 3A shows a flow diagram illustrating a method of updating an AI model instance in accordance with an embodiment.
Figure 3B:
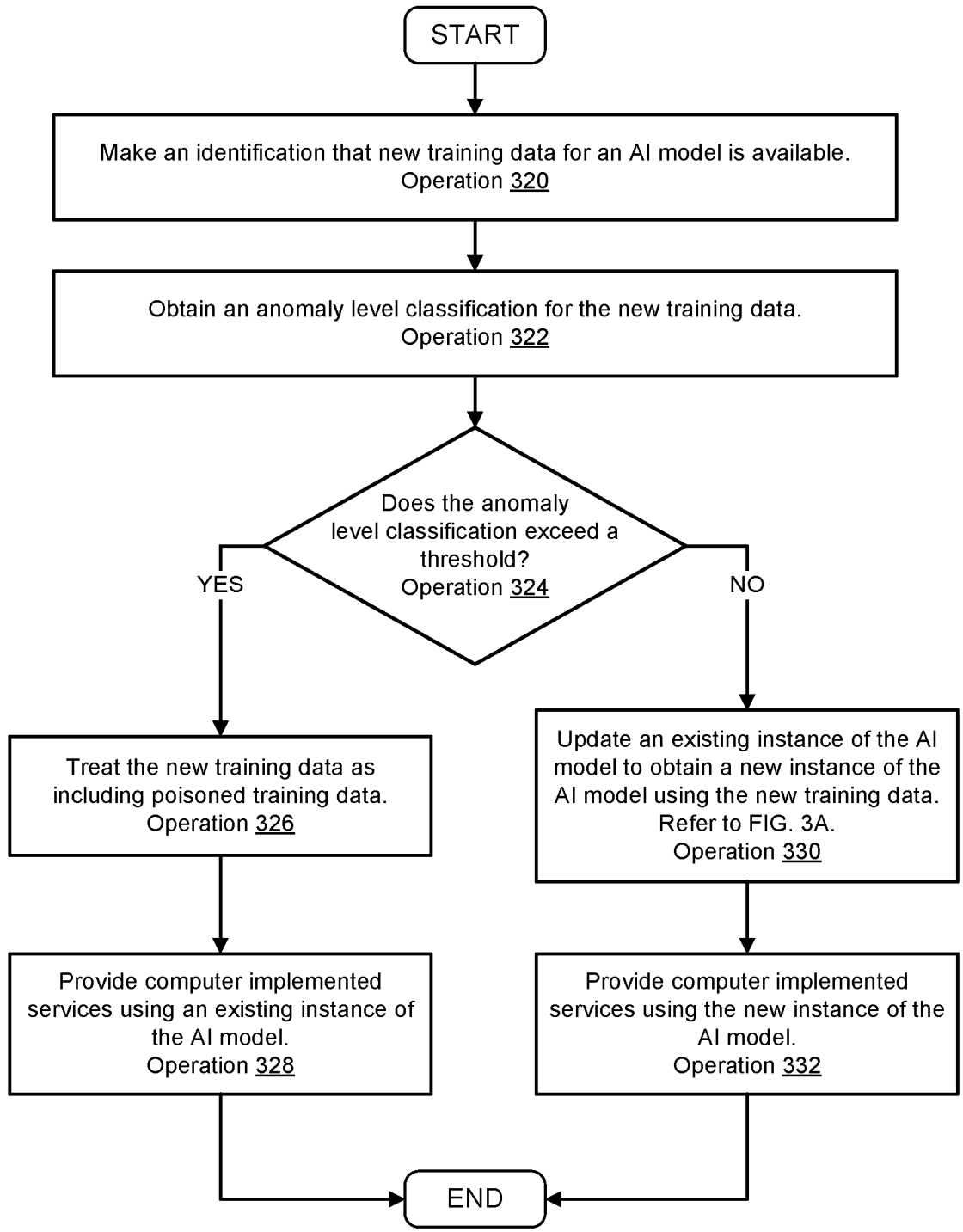
FIG. 3B shows a flow diagram illustrating a method for providing computer implemented services in accordance with an embodiment.
Figure 3C:
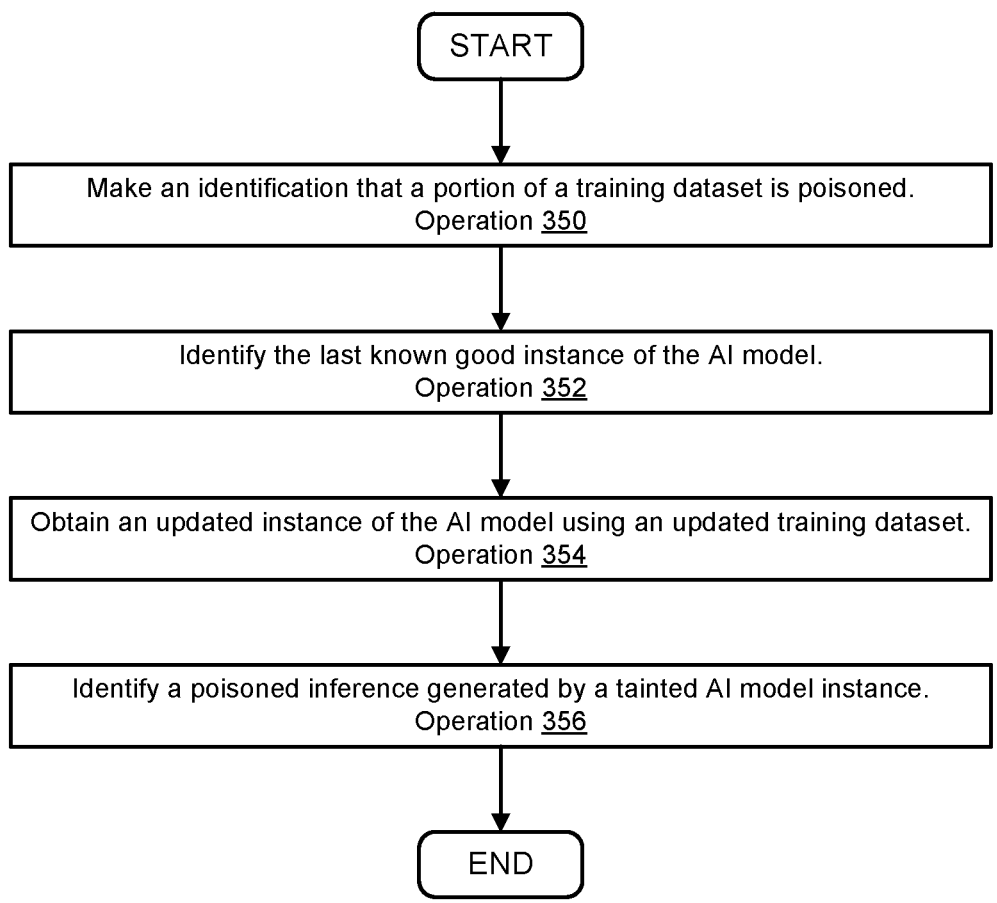
FIG. 3C shows a flow diagram illustrating a method of managing poisoned training data in accordance with an embodiment.

As discussed above, the components of FIG. 1 may perform various methods to manage AI models. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a muti-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data linearly correlated with the selected features and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data and/or unlabeled data. The training data included in the training dataset may be processed, cleansed and/or evaluated for quality in order to prepare the training dataset for use in training AI models.

Refer to FIG. 3B for additional details regarding preparing new training data prior to use in training of AI models.

At operation 302, a trained AI model instance may be obtained using the AI model and the training dataset. The trained AI model may be obtained by training the AI model using a training system and a training dataset. Refer to FIGS. 2A-2C for additional details regarding obtaining a trained AI model.

The training system may employ machine learning techniques such as supervised learning, self-supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data (e.g., new training data), and/or other characteristics to corresponding conditions that, if met, indicate that the update condition is satisfied.

For F example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, (iv) metadata identifying data sources from which training data has been collected, and/or (v) metadata identifying the input (e.g., the ingest data) used to generate the inference.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a weight of a first element in a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing (i) an identifier for an input used to obtain the inference, (ii) an identifier for the inference, (iii) identification information for the inference consumer, (iv) a time stamp indicating when the inference was generated, and/or (v) other attributes of the inference (e.g., confidence scores).

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, (iii) identify a malicious party and/or a goal of a malicious party that has supplied poisoned training data (refer to the discussion of FIG. 3B), and/or (iv) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance based on an updated training dataset and using a training system. The updated training dataset may include newly acquired training data (e.g., training data that has not already been used to train the trained AI model instance and that has survived screening, described with respect to FIG. 3B).

The training system may employ machine-learning methods such as incremental learning, which may allow an additional training step as new training data becomes available to be performed, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data and/or otherwise removing the impact of the poisoned training data on the trained AI model instance.

The method may end following operation 310.

Using the method illustrated in FIG. 3A, a system in accordance with embodiments disclosed herein may be placed in condition to mitigate the impact of poisoned training data through proactive preparation for model revision, retraining, and poisoned inference identification.

However, remediating the impact of poisoned training data may be computationally expensive. Refer to FIG. 3C for additional details regarding remediating AI models that have been poisoned. To reduce the computational cost for providing untainted inferences, a system in accordance with an embodiment may attempt to proactively prevent poisoned training data from being used to update AI models.

Turning to FIG. 3B, a flow diagram illustrating a method for providing computer implemented services using AI models in accordance with an embodiment is shown. The method may be performed by a data processing system, and/or another device.

At operation 320, an identification is made that new training data for an AI model is available. The identification may be made by monitoring when new training data becomes available. The new training data may become available, for example, when ingest data is obtained and used to obtain an inference or when new training data is provided by a data source. The identification may be made similarly to as described with respect to operation 306.

At operation 322, an anomaly level classification for the new training data is obtained. The anomaly level classification may be obtained (i) using an anomaly model obtained using training data previously used to train an instance of the AI model, (ii) by performing one or more comparisons between the new training data and the training data previously used to train an instance of the AI model, and/or (iii) via other methods.

For example, the anomaly model may provide quantifications regarding the level of anomalousness of portions of the new training data. The quantifications may be compared to thresholds to identify whether each of the portions is sufficiently anomalous to be considered anomalies (e.g., if the thresholds are exceeded).

The anomaly level classification may indicate (i) which portions of the new training data are anomalous and (ii) the degree of anomalousness of the portions.

The anomaly level classifications may also be obtained by performing a screening process using various metrics. The metrics may include samples of data previously identified as being highly anomalous (or at least exceeding a particular threshold level). If any of the portions of the new training data are similar to the samples of the data, then the similar portions of the new training data may be treated as being anomalous and may not need to be screened using an anomaly model.

At operation 324, a determination is made regarding whether the anomaly level classification exceeds a threshold. The determination may be made by comparing the anomaly level classification (e.g., a quantification) to the threshold.

If it is determined that the anomaly level classification exceeds the threshold, then the method may proceed to operation 326. Otherwise the method may proceed to operation 330 (e.g., which indicates that the new training data is unlikely to include poisoned training data).

At operation 326, the new training data is treated as including poisoned training data. The new training data may be treated as including poisoned training data by (i) screening the portions of the training data identified as including poisoned training data from being integrated into the training data repository and/or used to update AI models, and (ii) performing remedial actions to reduce the likelihood of new poisoned training data from being used in the future.

For example, the remedial action may include (i) flagging a source of the new training data as potentially being compromised, (ii) submitting the identified poisoned training data for additional analysis by a subject matter expert to confirm that the new training data does including poisoned training data (the training data may be unlabeled, the subject matter expert may label it and/or otherwise analyze it), and/or (iii) other types of actions to reduce the likelihood of poisoned training data being used in the future may be performed.

At operation 328, computer implemented services are provided using an existing instance of the AI model (e.g., not trained using the new training data, may be a most current instance of the AI model or a previous instance). The computer implemented services may be provided by (i) obtaining new ingest data, (ii) generating an inference using the new ingest data and the existing instance of the AI model, and (iii) providing the inference to a downstream consumer that uses the inference to provide the computer implemented services.

The method may end following operation 328.

Returning to operation 324, the method may proceed to operation 330 following operation 324 when the training data is unlikely to include poisoned training data.

At operation 330, an existing instance of the AI model is updated to obtain a new instance of the AI model using the new training data. The new instance of the AI model may be obtained by further training of the existing instance of the AI model with the new training data. Refer to operation 310 for additional details regarding additional training of AI models using new training data.

At operation 332, computer implemented services are provided using the new instance of the AI model (e.g., trained using the new training data). The computer implemented services may be provided by (i) obtaining new ingest data, (ii) generating an inference using the new ingest data and the new instance of the AI model, and (iii) providing the inference to a downstream consumer that uses the inference to provide the computer implemented services. The method may end following operation 332.

Using the method illustrated in FIG. 2B, poisoned training data may be less likely to be used to train AI models. However, when used to train AI models, the impact of poisoned training data may be managed through reversion and retraining, as discussed below with respect to FIG. 3C.

Turning to FIG. 3C, a flow diagram illustrating a method of managing poisoned training data in accordance with an embodiment is shown. The method may be performed by a data processing system, and/or another device.

At operation 350, an identification may be made that a portion of a training dataset is poisoned. The identification may be made by (i) receiving the identification from another entity, (ii) reading the identification from storage, and/or (iv) making the identification. The identification may be made, for example, by performing various analysis of attributes of AI model instances, of training data and/or operation of entities from which the training data may be obtained.

At operation 352, the last known good instance of the AI model is identified. The last known good instance of the AI model may be identified by identifying the first AI model instance trained using the poisoned training dataset, identifying a second AI model instance trained before the first AI model instance (e.g., that is not trained using the poisoned training dataset), and using the second AI model instance as the last known good instance of the AI model.

At operation 354, an updated instance of the AI model is obtained using an updated training dataset. The updated training dataset may be obtained by reading training data from an updated training data repository. The updated training data repository may be obtained by removing the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

At operation 356, a poisoned inference is identified. The poisoned inference may be a hard example and/or may be identified by accessing information stored in a snapshot of a tainted AI model instance. The snapshot of the tainted AI model instance may include associations (e.g., stored metadata) between the tainted AI model and any inference (e.g., a poisoned inference) generated by the tainted AI model. Once identified, the poisoned inference may be remediated.

The poisoned inference may be remediated by (i) notifying an inference consumer that consumed the poisoned inference, of the poisoned inference, (ii) obtaining a replacement inference (e.g., using the last known good instance of the AI model and the ingest dataset used to obtain the poisoned inference), (iii) providing the replacement inference to an inference consumer that consumed the poisoned inference, (iv) deleting the poisoned inference from an inference repository, and/or (v) retaining the unpoisoned inference.

The method may end following operation 356.

Using the method illustrated in FIG. 3D, a system in accordance with an embodiment may reduce the impact of poisoned training data through model reversion, retraining, and/or remediation.

Figure 4:
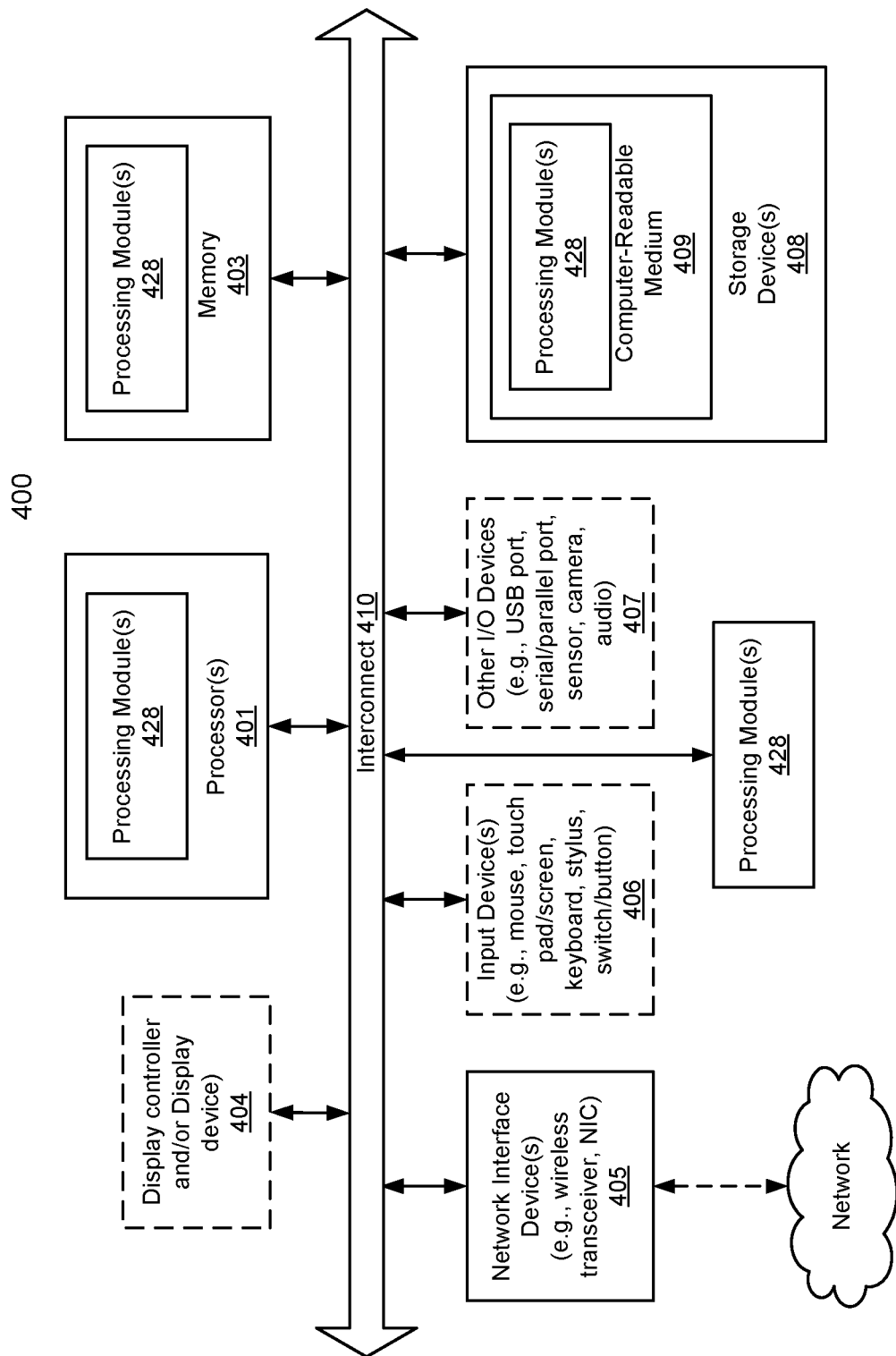
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an artificial intelligence (AI) model, comprising:
    making an identification, by a data processing system that is hosting an instance of the AI model and using the instance of the AI model to provide computer implemented services, that new training data for an instance of the AI model hosted on the data processing system is available to the data processing system; and
    based on the identification, by the data processing system:
        obtaining an anomaly level classification for the new training data;
        making a determination regarding whether the anomaly level classification exceeds an anomaly level threshold;
        in a first instance of the determination where the anomaly level classification exceeds the anomaly level threshold, the method further comprises and by the data processing system:
            treating the new training data as comprising poisoned training data; and
            using the instance of the AI model hosted on the data processing system as is without any retraining and/or repairing of the instance of the AI model hosted on the data processing system to provide the computer implemented services; and
        in a second instance of the determination where the anomaly level classification does not exceed the anomaly level threshold, the method further comprises and by the data processing system:
            performing learning using the new training data to obtain a new instance of the instance of the AI model hosted on the data processing system; and
            using the new instance of the instance of the AI model hosted on the data processing system to provide the computer implemented services.

2. The method of claim 1, wherein the anomaly level classification is based on a corpus of training data used to obtain the instance of the AI model hosted on the data processing system where a previous instance of the instance of the AI model hosted on the data processing system was trained using the corpus of the training data to obtain the instance of the AI model hosted on the data processing system and the corpus of the training data excluding the new training data.

3. The method of claim 2, wherein the corpus of the training data is unlabeled.

4. The method of claim 2, further comprising, after the new training data is treated as comprising the poisoned training data:
    performing a similarity analysis between a portion of the new training data and the corpus of the training data to identify a portion of the corpus of the training data;
    treating the portion of the corpus of the training data as potentially comprising second poisoned training data; and
    instead of using the instance of the AI model hosted on the data processing system as is to provide the computer implemented service, using a previous instance of the instance of the AI model hosted on the data processing system that is free from influence of the second poisoned training data to provide the computer implemented services.

5. The method of claim 4, further comprising:
    determining that second new training data for the instance of the AI model hosted on the data processing system is available;
    using classification metrics obtained during the similarity analysis to identify a portion of the second new training data; and
    treating the portion of the second new training data as comprising third poisoned training data.

6. The method of claim 5, wherein treating the new training data as comprising the poisoned training data further comprises:
    excluding the new training data from being integrated into the corpus of the training data; and
    submitting the new training data for analysis by a subject matter expert to confirm whether the new training data comprises the poisoned training data.

7. The method of claim 1, wherein the new instance of the instance of the AI model hosted on the data processing system is based the AI model.

8. The method of claim 7, wherein the new training data is unlabeled.

9. The method of claim 1, further comprising and by the data processing system prior to making the identification that the new training data for the instance of the AI model hosted on the data processing system is available to the data processing system:
    obtaining one or more snapshots of the instance of the AI model hosted on the data processing system, wherein the one or more snapshots are used to obtain an anomaly detection model that is used to obtain the anomaly level classification for the new training data.

10. The method of claim 1, further comprises and by the data processing system:
    obtaining one or more snapshots of the instance of the AI model hosted on the data processing system from a storage of the data processing system;
    using the one or more snapshots to obtain a corpus of training data used to obtain the instance of the AI model hosted on the data processing system where a previous instance of the instance of the AI model hosted on the data processing system was trained using the corpus of the training data to obtain the instance of the AI model hosted on the data processing system; and using the corpus of the training data and the new training data to obtain the anomaly level classification for the new training data.

11. A non-transitory machine-readable medium having instructions stored therein, which when executed by a processor of a data processing system, cause the processor to perform operations for managing an artificial intelligence (AI) model, the operations comprising:

making an identification that new training data for an instance of the AI model is available to the data processing system, the instance of the AI model being hosted on the data processing system and used by the data processing system to provide computer implemented services; and based on the identification:
obtaining an anomaly level classification for the new training data;
making a determination regarding whether the anomaly level classification exceeds an anomaly level threshold;
in a first instance of the determination where the anomaly level classification exceeds the anomaly level threshold, the operations further comprise:
treating the new training data as comprising poisoned training data; and
using the instance of the AI model hosted on the data processing system as is without any retraining and/or repairing of the instance of the AI model hosted on the data processing system to provide the computer implemented services; and
in a second instance of the determination where the anomaly level classification does not exceed the anomaly level threshold, the method further comprises:
performing learning using the new training data to obtain a new instance of the instance of the AI model hosted on the data processing system; and
using the new instance of the instance of the AI model hosted on the data processing system to provide the computer implemented services.

12. The non-transitory machine-readable medium of claim 11, wherein the anomaly level classification is based on a corpus of training data used to obtain the instance of the AI model hosted on the data processing system model where a previous instance of the instance of the AI model hosted on the data processing system was trained using the corpus of the training data to obtain the instance of the AI model hosted on the data processing system and the corpus of the training data excluding the new training data.

13. The non-transitory machine-readable medium of claim 12, wherein the corpus of the training data is unlabeled.

14. The non-transitory machine-readable medium of claim 12, wherein the operations further comprise, after the new training data is treated as comprising the poisoned training data:

performing a similarity analysis between a portion of the new training data and the corpus of the training data to identify a portion of the corpus of the training data; and
treating the portion of the corpus of the training data as potentially comprising second poisoned training data; and instead of using the instance of the AI model hosted on the data processing system as is to provide the computer implemented service, using a previous instance of the instance of the AI model hosted on the data processing system that is free from influence of the second poisoned training data to provide the computer implemented services.

15. The non-transitory machine-readable medium of claim 14, wherein the operations further comprise:
determining that second new training data for the instance of the AI model hosted on the data processing system is available;
using classification metrics obtained during the similarity analysis to identify a portion of the second new training data; and
treating the portion of the second new training data as comprising third poisoned training data.

16. The non-transitory machine-readable medium of claim 15, wherein treating the new training data as comprising the poisoned training data further comprises:
excluding the new training data from being integrated into the corpus of the training data; and
submitting the new training data for analysis by a subject matter expert to confirm whether the new training data comprises the poisoned training data.

17. A data processing system, comprising:
a processor; and
a memory coupled to the processor to store instructions, which when executed by the processor, cause the processor to perform operations for managing an instance of an artificial intelligence (AI) model that is hosted on the data processing system and used by the data processing system to provide computer implemented services, the operations comprising:
making an identification that new training data for the instance of the AI model hosted on the data processing system is available to the data processing system; and
based on the identification:
obtaining an anomaly level classification for the new training data;
making a determination regarding whether the anomaly level classification exceeds an anomaly level threshold;
in a first instance of the determination where the anomaly level classification exceeds the anomaly level threshold, the operations further comprise:
treating the new training data as comprising poisoned training data;
using the instance of the AI model hosted on the data processing system as is without any retraining and/or repairing of the instance of the AI model hosted on the data processing system to provide the computer implemented services; and
in a second instance of the determination where the anomaly level classification does not exceed the anomaly level threshold, the comprises operations further comprise:
performing learning using the new training data to obtain a new instance of the instance of the AI model hosted on the data processing system; and
using the new instance of the instance of the AI model hosted on the data processing system to provide the computer implemented services.

18. The data processing system of claim 17, wherein the anomaly level classification is based on a corpus of training data used to obtain the instance of the AI model hosted on the data processing system where a previous instance of the instance of the AI model hosted on the data processing system was trained using the corpus of the training data to obtain the instance of the AI model hosted on the data processing system and the corpus of the training data excluding the new training data.

19. The data processing system of claim 18, wherein the corpus of the training data is unlabeled.

20. The data processing system of claim 18, wherein the operations further comprise, after the new training data is treated as comprising the poisoned training data:
- performing a similarity analysis between a portion of the new training data and the corpus of the training data to identify a portion of the corpus of the training data; and
- treating the portion of the corpus of the training data as potentially comprising second poisoned training data; and
- instead of using the instance of the AI model hosted on the data processing system as is to provide the computer implemented service, using a previous instance of the instance of the AI model hosted on the data processing system model that is free from influence of the second poisoned training data to provide the computer implemented services.

* * * * *

UNITED STATES PATENT AND TRADEMARK OFFICE
CERTIFICATE OF CORRECTION

| | | |
|---|---|---|
| PATENT NO. | : 12,321,498 B2 | Page 1 of 1 |
| APPLICATION NO. | : 18/147769 | |
| DATED | : June 3, 2025 | |
| INVENTOR(S) | : Ofir Ezrielev, Amihai Savir and Tomer Kushnir | |

It is certified that error appears in the above-identified patent and that said Letters Patent is hereby corrected as shown below:

In the Claims

Claim 7, Column 22, Line 47, The phrase "is based the AI model" should instead read -- is based on the AI model --.

Claim 12, Column 23, Line 49, The phrase "data processing system model" should instead read -- data processing system --.

Claim 20, Column 20, Lines 24-25, The phrase "data processing system model" should instead read -- data processing system --.

Signed and Sealed this
Thirtieth Day of September, 2025

John A. Squires
*Director of the United States Patent and Trademark Office*